United States Patent [19]

Hutter

[11] Patent Number: 4,588,549
[45] Date of Patent: May 13, 1986

[54] AUTOMATIC COOLANT FLOW CONTROL DEVICE FOR A NUCLEAR REACTOR ASSEMBLY

[75] Inventor: Ernest Hutter, Wilmette, Ill.

[73] Assignee: The United States of America as represented by the United States Department of Energy, Washington, D.C.

[21] Appl. No.: 574,509

[22] Filed: Jan. 27, 1984

[51] Int. Cl.⁴ .................. G21C 7/32; G21C 15/04
[52] U.S. Cl. ................................ 376/352; 376/175; 376/399
[58] Field of Search ............. 376/175, 210, 290, 352, 376/377, 389, 399, 244

[56] References Cited

U.S. PATENT DOCUMENTS

| 2,831,807 | 4/1958 | McGarry | 376/352 |
| 3,510,396 | 5/1970 | Winkler et al. | 376/352 |
| 3,892,625 | 7/1975 | Patterson | 376/352 |

Primary Examiner—Charles T. Jordan
Assistant Examiner—Richard Klein
Attorney, Agent, or Firm—Hugh W. Glenn; Robert J. Fisher; Judson R. Hightower

[57] ABSTRACT

A device which controls coolant flow through a nuclear reactor assembly comprises a baffle means at the exit end of said assembly having a plurality of orifices, and a bimetallic member in operative relation to the baffle means such that at increased temperatures said bimetallic member deforms to unblock some of said orifices and allow increased coolant flow therethrough.

2 Claims, 4 Drawing Figures

AUTOMATIC COOLANT FLOW CONTROL DEVICE FOR A NUCLEAR REACTOR ASSEMBLY

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to a device for controlling the flow of coolant through an assembly in a nuclear reactor. More particularly, this invention relates to a device for controlling the flow of coolant through an assembly in a nuclear reactor which device responds automatically to changes in temperature of the flowing coolant.

A nuclear reactor comprises a core which holds in a matrix pattern a variety of assemblies such as fuel assemblies, blanket assemblies, control rod assemblies, and reflector assemblies. The matrix pattern in which the assemblies are arranged facilitates a sustained nuclear chain reaction.

In a liquid metal fast breeder reactor (LMFBR) each assembly is housed within a hexagonal tube about 200 inches long and about 6 inches in diameter. Sodium coolant enters each assembly through a bottom adapter, flows upwardly past the heat producing elements of the assembly, and exits the assembly in its heated condition via an upper adapter. The coolant then flows out of the vessel, carrying the heat to a heat exchange system where it is converted to electricity.

In order to sustain the nuclear chain reaction about 600–1000 assemblies are required. Each type of assembly has a different rate of heat production; this rate is further affected by the location of the assembly in the matrix pattern.

It is desirable to have the coolant leave each of the assemblies at about the same temperature to reduce severe thermal stresses on the proximate components of the reactor. Accordingly, each type of assembly is appropriately orificed at the bottom adapter and often at the reactor core support plenum. In this way the amount of coolant flowing through each assembly housing is controlled such that a greater volume of coolant flows through those assemblies which produce a larger amount of heat, and a lesser volume of coolant flows through those assemblies which produce a smaller amount of heat. This technique for providing a relatively uniform exit temperature is well known in the art of nuclear reactors.

Breeder reactors are unique in that new fissionable material is created in various portions of the reactor core, particularly in the blanket and reflector assemblies. The new fissionable material causes a significant increase in the localized reactivity and a corresponding increase in the localized heat production of these assemblies over their lifetimes, which is typically about 3–5 years. The volume of coolant flowing through these assemblies must be large enough to accommodate the maximum heat production which occurs at their end-of-life. This large volume of coolant typically results in overcooling of the assemblies at their beginning-of-life when their heat production is less. It would be desirable to be able to mechanically adjust the coolant flow through these assemblies over their lifetimes to accommodate changes in the rate of heat production. To date, it has not been possible to mechanically adjust coolant flow safely and economically.

SUMMARY OF THE INVENTION

It is thus one object of the invention to provide a device for controlling the flow of coolant through an assembly in a nuclear reactor.

It is yet another object of the invention to provide a device for controlling the flow of coolant through an assembly in a nuclear reactor which responds automatically to changes in temperature of the flowing coolant.

It is still another object of the invention to provide a device for controlling the flow of coolant through an assembly in a nuclear reactor which responds in proportion to the magnitude of change in temperature of the flowing coolant so that a relatively steady coolant outlet temperature is attained.

Additional objects, advantages, and novel features of the invention will be set forth in part in the following description.

In accordance with the invention, a device is disclosed comprising a baffle means fitted to the exit portion of an assembly and provided with a plurality of orifices. The device further includes a bimetallic member positioned in operative relation to said baffle means. The two dissimilar metals of the bimetallic member are arranged so that the metal having the larger coefficient of expansion is on the inner surface adjacent the baffle means and the metal having the smaller coefficient of expansion is on the outer surface away from the baffle means. At relatively low coolant temperatures, such as those that occur at the beginning of assembly life, the bimetallic member blocks the flow of coolant through some of said baffle orifices. As the temperature of the assembly rises over its lifetime, the coolant passing therethrough gets hotter and some of the coolant temperature gain is transferred to the baffle means and the bimetallic member. As the temperature of the bimetallic member rises it deforms so as to allow coolant flow through some of said previously blocked baffle means orifices, thereby allowing for increased coolant flow and greater cooling of the assembly. The extent of deformation is generally proportional to the rise in coolant temperature, so that as the temperature of the assembly rises over its lifetime the bimetallic member responds appropriately.

In a preferred embodiment the baffle means is a generally cylindrical cap which fits over the exit opening of the assembly, and which is provided with a plurality of orifices. The bimetallic member is a generally cylindrical sleeve which fits around the sides of said cap and which is provided with a slit. At relatively low temperatures the sleeve is in a closed position and blocks off some of said orifices. As the temperature rises the sleeve gradually opens at said slit to allow coolant flow through some of said orifices. At higher temperatures the sleeve opens still further to allow even greater coolant flow. The instant invention thereby responds automatically to changes in coolant temperature and in proportion to the magnitude of the change. Furthermore, the instant invention is efficient, safe and involves no moving parts.

DETAILED DESCRIPTION OF THE INVENTION

Figure 1:
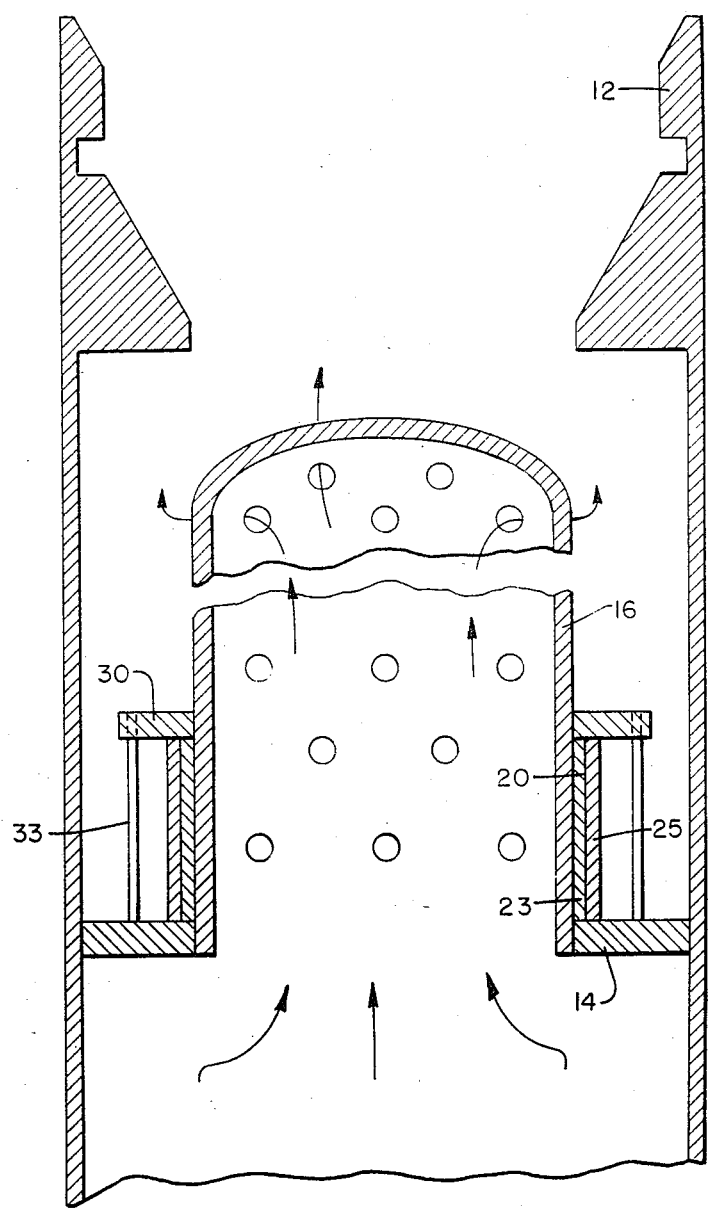
FIG. 1 is an elevational view of the instant invention showing the baffle means and showing the bimetallic member in cross-section.

FIG. 1 shows generally the upper end of a reactor assembly housed in an upper adapter 12 of a breeder reactor. The assembly is one which experiences increased heat production over the course of its lifetime, such as a blanket assembly or reflector assembly. The exit aperture of the assembly is fitted with plate 14 which supports baffle means 16. In a preferred embodiment of the invention, baffle means 16 is a generally cylindrical cap provided with a plurality of orifices. As shown by the arrows, liquid coolant flows upward through the assembly and out of baffle means 16 through the orifices.

Figure 2:
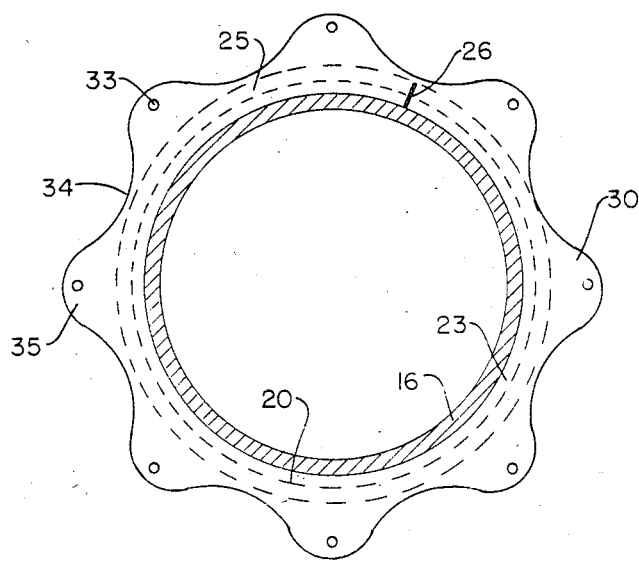
FIG. 2 is a plan view of the instant invention showing the bimetallic member in a closed position.

Bimetallic member 20 is positioned in operative relation to baffle means 16. In the illustrated preferred embodiment, bimetallic member 20 shown in cross-section is a generally cylindrical sleeve which is positioned to cover some of the orifices of baffle means 16. Bimetallic member 20 comprises two layers 23 and 25 of different materials having different thermal coefficients of expansion. The thermal coefficient of expansion of inner layer 23 is greater than that of outer layer 25. As shown in FIG. 2, bimetallic member 20 is provided with a slit 26 which extends the length of member 20. Slit 26 may be vertical or it may be angled as desired for a particular assembly design.

Figure 3:
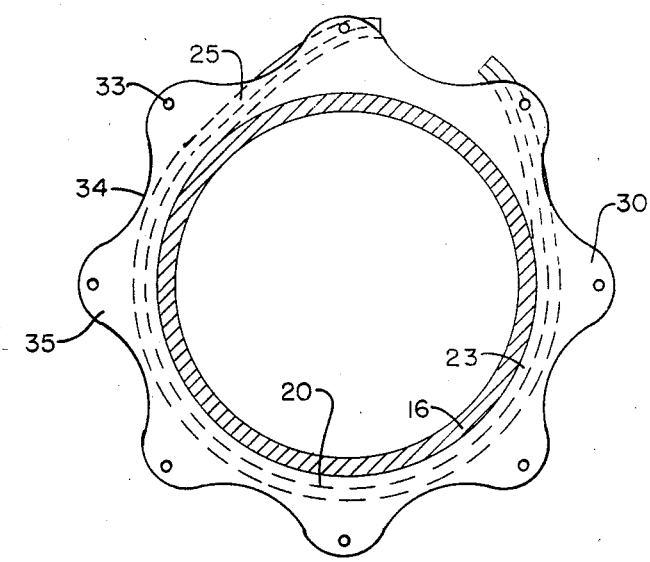
FIG. 3 is a plan view of the instant invention showing the bimetallic member in an open position.

As fuel is bred in the assembly the reactivity of the assembly will increase and its temperature will rise. The temperature of the coolant flowing through the assembly will rise correspondingly. As the heated coolant flows through the open orifices and past the blocked orifices of baffle means 16, the temperature gain of the coolant is transferred to baffle means 16 and bimetallic member 20. As bimetallic member 20 is heated, inner layer 23 expands at a faster rate than outer layer 25, due to its higher thermal coefficient of expansion. This will cause member 20 to deform such that it will open at slit 26 and pull away from baffle means 16, as shown in FIG. 3. When this occurs, orifices in baffle means 16 that were previously blocked become uncovered, so that more coolant can flow through the assembly. The instant invention thereby automatically responds to increases in assembly temperature to allow more coolant flow when required. Because more coolant flows through the assembly, the coolant does not become significantly hotter than coolant flowing through other assemblies.

The device of the instant invention has many advantages. It provides an automatic temperature control for those assemblies that experience a significant change in heat production during their in-reactor lifetimes. In so doing, it allows an improved match with other assembly coolant outlet temperatures, thereby reducing thermal stresses of proximate reactor components. In addition, the increased coolant flow guards against inadvertent overheating of the core assembly internals. The device is self-adjusting, in that it can repeatedly uncover or cover the flow orifices as temperature changes require. The device also responds in proportion to the change in coolant temperature, rather than merely alternating between an open and a closed position, so that a substantially steady coolant outlet temperature can be attained. Finally, the device is inherently reliable in that its operation is based on first principles and does not rely upon independent actuation.

Baffle means 16 may be provided with a retaining spider 30 which maintains bimetallic sleeve 20 in its proper location. Spider 30 may be welded to baffle means 16, or it may be supported from plate 14 by a plurality of posts 33, as illustrated in FIG. 1.

Spider 30 is designed so that it does not block the flow of coolant in the upward direction when bimetallic sleeve 20 is in the open position. In the embodiment illustrated in FIGS. 2 and 3 a thin collar 34 encircles baffle means 16 and is provided with a plurality of radially extending lobes 35. The segments of collar 34 between the lobes 35 are sufficiently thin such that bimetallic member 20 can open radially beyond the width of collar 34 to allow coolant to flow upwardly between said lobes. This is specifically shown in FIG. 3. It may be seen that the design of spider 30 and in particular the width of collar 34 may further affect the rate of coolant flow through said assembly.

Figure 4:
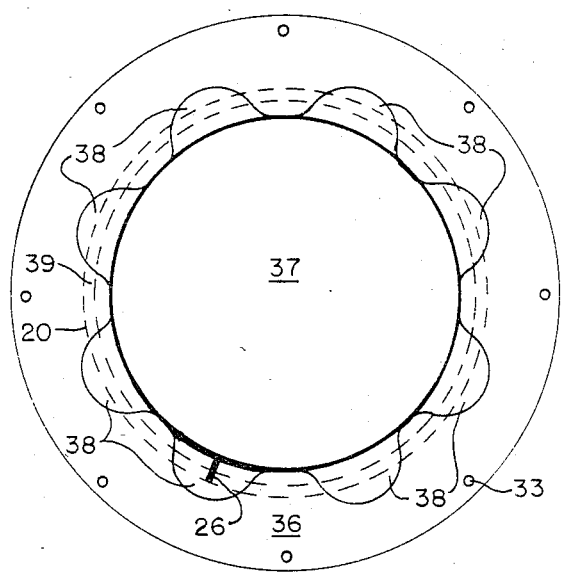
FIG. 4 is a plan view of an alternative embodiment of a retaining spider to be used in the instant invention.

Another embodiment of retaining spider 30 is illustrated in FIG. 4. In this embodiment a generally disk-shaped member 36 is provided with a central orifice 37 which accommodates baffle means 16. Around the circumference of central orifice 37 are a plurality of ports 38 whereby the sections of member 36 between said ports 38 form tabs 39 which extend radially inwardly to support baffle means 16. It may be seen that when bimetallic member 20 located beneath the spider 30 is in its open position, coolant can flow upwardly past said spider through ports 38. It may be seen that the total area of the ports 38 will also affect the rate of coolant flow through the assembly.

The foregoing description of a preferred embodiment is not intended to limit the invention to the precise form disclosed. Many modifications and variations will be apparent to those skilled in the art in light of the above teaching. For example, the size and placement of the orifices in the baffle means may be varied according to the type and location of the particular assembly. In addition, many variations are possible with respect to the bimetallic member. For example, the two metal layers need not be of the same thickness, but may be of different thicknesses to increase or reduce the response of the member to changes in temperature. Also, the choice of materials for each layer will depend on the required difference between the thermal coefficients of expansion of each layer. The particular embodiment was chosen and described in order to best explain the principles of the invention and its practical application.

The embodiments of this invention in which an exclusive property or privilege is claimed are defined as follows:

1. For a nuclear reactor assembly through which coolant flows, a coolant flow control device comprising:

a substantially cylindrical baffle extending lengthwise over the coolant exit of said assembly, said baffle having cylindrical walls and a plurality of orifices therein for coolant flow; and a cylindrical sleeve of lesser length than said cylindrical baffle, disposed coaxially outside in contact with a lengthwise portion of said baffle to block only a portion of said plurality of orifices, said sleeve including an outer layer of a first metallic material contiguous throughout its length with an inner layer of a second metallic material, said second metallic material of the inner layer having a higher thermal coefficient of expansion than said first metallic material of the outer layer, said sleeve further including a slit through said first and second layers along the entire length thereof to be capable of assuming a first position in contact along its entire length with substantially the full cylindrical circumference of the baffle at a first temperature and to be capable of assuming a second position in contact with less than substantially the full circumference of the cylindrical baffle leaving space therebetween at a second temperature higher than the first temperature wherein less of the plurality of orifices are blocked in the second than in the first position of the sleeve to achieve coolant flow control responsive to temperature.

2. The coolant flow control device of claim 1 further including a retaining collar around said cylindrical baffle engaging edge surfaces of the first and second layers of the cylindrical sleeve at one end of the sleeve's length, said collar being of scalloped configuration in respect to its width leaving open segments between scalloped lobes for alignment with said space between baffle and sleeve in said second sleeve position.

* * * * *